(12) United States Patent
Bittner et al.

(10) Patent No.: US 10,646,938 B2
(45) Date of Patent: May 12, 2020

(54) PRECISION ELECTROCHEMICAL MACHINE FOR GEAR MANUFACTURE

(71) Applicant: Sikorsky Aircraft Corporation, Stratford, CT (US)

(72) Inventors: Edward H. Bittner, Madison, CT (US); William Patrick Murphy, Monroe, CT (US); Bruce D. Hansen, Shelton, CT (US); Christopher J. Mussel, Oxford, CT (US); Yuriy Gmirya, Woodbridge, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 21 days.

(21) Appl. No.: 15/868,563

(22) Filed: Jan. 11, 2018

(65) Prior Publication Data
US 2019/0210130 A1    Jul. 11, 2019

(51) Int. Cl.
| | | |
|---|---|---|
| *B23H 3/04* | (2006.01) | |
| *B23H 9/00* | (2006.01) | |
| *B23H 11/00* | (2006.01) | |
| *B23F 17/00* | (2006.01) | |
| *B23H 5/08* | (2006.01) | |
| *B23H 7/26* | (2006.01) | |

(52) U.S. Cl.
CPC ............... *B23H 5/08* (2013.01); *B23F 17/00* (2013.01); *B23H 3/04* (2013.01); *B23H 7/26* (2013.01); *B23H 9/003* (2013.01); *B23H 2600/12* (2013.01)

(58) Field of Classification Search
CPC ...................................... B23H 9/003
See application file for complete search history.

(56) References Cited

U.S. PATENT DOCUMENTS

| | | | | |
|---|---|---|---|---|
| 3,046,206 A | * | 7/1962 | Johnson | B23H 3/08 205/649 |
| 3,553,095 A | * | 1/1971 | Daniel | B23H 9/003 204/212 |
| 8,540,861 B2 | | 9/2013 | Bayer et al. | |
| 9,597,743 B2 | | 3/2017 | Bittner | |

* cited by examiner

*Primary Examiner* — Brian W Cohen
(74) *Attorney, Agent, or Firm* — Cantor Colburn LLP

(57) ABSTRACT

A method of manufacturing a gear, the method includes applying a first charge to a workpiece and applying a second, opposite charge to an electrochemical machining (ECM) attachment, the ECM attachment having a pattern. The method further includes simultaneously forming a plurality of surfaces of a gear tooth in the workpiece using the pattern of the ECM attachment while applying the first charge to the workpiece and applying the second charge to the ECM attachment and turning the workpiece and the ECM attachment in opposite rotational directions. The plurality of surfaces includes at least one end face and a top land of the gear tooth.

6 Claims, 6 Drawing Sheets

PRECISION ELECTROCHEMICAL MACHINE FOR GEAR MANUFACTURE

BACKGROUND

The subject matter disclosed herein generally relates to gears, and more particularly, to improvements in a method of manufacturing a gear including manufacture of the various surfaces of the gear teeth.

Gears are used in various industrial and technological applications to permit power transmission from one rotating or translating element to another. Each gear generally includes an array of gear teeth that mesh with the gear teeth of another gear so that the rotation or translation of the first gear can be transmitted to the second.

Machining is normally required to form precision gears. One method for machining precision gears is grinding with an abrasive wheel type media such as aluminum oxide or Cubic Boron Nitride tooling. In many cases, however, it may not be possible to grind with a wheel type grinder due in part to geometry limitations that may create an interference condition. Lapping and honing methods have also been utilized but may have limited results because these machining methods may not provide the accuracy demanded in aerospace quality gears. Typical computer numerically controlled honing machines are effectively utilized in some aerospace applications, but the machines may be cost prohibitive as such machines require vitrified type cutter tooling with diamond dressings.

Regardless of the machining method being used, such precision gears are typically formed by first machining in rough teeth and then performing a precision machining operation to achieve teeth within the desired tolerances. Accordingly, in view of the limitations stated above, the manufacture of aerospace quality gears and splines is typically a labor intensive and expensive process.

BRIEF DESCRIPTION

According to one embodiment, a method of manufacturing a gear, the method includes applying a first charge to a workpiece and applying a second, opposite charge to an electrochemical machining (ECM) attachment, the ECM attachment having a pattern. The method further includes simultaneously forming a plurality of surfaces of a gear tooth in the workpiece using the pattern of the ECM attachment while applying the first charge to the workpiece and applying the second charge to the ECM attachment and turning the workpiece and the ECM attachment in opposite rotational directions. The plurality of surfaces includes at least one end face and a top land of the gear tooth.

In addition to one or more of the features described above, or as an alternative, in further embodiments the gear tooth is one of a plurality of gear teeth and the method further comprises forming a plurality of surfaces of the plurality of gear teeth by applying the first charge to the workpiece and applying the second charge to the ECM attachment and turning the workpiece and the ECM attachment in opposite rotational directions.

In addition to one or more of the features described above, or as an alternative, in further embodiments applying the first charge to the workpiece and applying the second charge to the ECM attachment results in removal of material from the workpiece.

In addition to one or more of the features described above, or as an alternative, in further embodiments applying the second charge to the ECM attachment charges the ECM attachment as a cathode.

In addition to one or more of the features described above, or as an alternative, in further embodiments turning the workpiece and the ECM attachment in opposite rotational directions further comprises turning the workpiece about a first axis and turning the ECM attachment about a second axis, the ECM attachment and the workpiece being oriented in an intermeshing arrangement.

In addition to one or more of the features described above, or as an alternative, in further embodiments the first axis and the second axis are generally parallel.

In addition to one or more of the features described above, or as an alternative, in further embodiments forming the gear tooth further comprises: coarsely machining the work piece to roughly form the gear tooth in the work piece; and precision machining the work piece to refine the roughly formed gear tooth to a final dimension.

In addition to one or more of the features described above, or as an alternative, in further embodiments a single cathode is used for coarsely machining the work piece and for precision machining the work piece.

According to another embodiment, a cathode for forming a plurality of gear teeth in a workpiece includes a body having an outer periphery and a plurality of features spaced about the outer periphery of the body. Each of the plurality of features includes a first end, a second end, and a contoured member extending between the first end and the second end. When the body is positioned adjacent the workpiece such that the first end of the plurality of features is arranged adjacent a first surface of the workpiece and the second end of the plurality of features is arranged adjacent a second surface of the workpiece and the cathode is electrically charged, material is removed from the workpiece.

In addition to one or more of the features described above, or as an alternative, in further embodiments a diameter of the cathode and a diameter of the workpiece are identical.

In addition to one or more of the features described above, or as an alternative, in further embodiments a diameter of the cathode and a diameter of the workpiece are different.

In addition to one or more of the features described above, or as an alternative, in further embodiments the plurality of features are substantially identical.

In addition to one or more of the features described above, or as an alternative, in further embodiments each of the plurality of gear teeth has tooth faces defining at least one end face and a top land, the tool being operable to form a gear tooth including the at least one end face and top land simultaneously.

In addition to one or more of the features described above, or as an alternative, in further embodiments a width of the contoured member extending between the first end and the second end is equal to a face width of the gear tooth.

In addition to one or more of the features described above, or as an alternative, in further embodiments the first end and the second end of each feature of the plurality of features are radially oversized relative to the contoured member.

According to another embodiment, a method of manufacturing a gear, the method includes coarsely machining a work piece to roughly form a plurality of gear teeth in the work piece and precision machining the work piece to refine the plurality of gear teeth to a final dimension. Coarsely machining the work piece and precision machining the work piece occur continuously.

In addition to one or more of the features described above, or as an alternative, in further embodiments comprising removing debris from the work piece during all machining processes.

In addition to one or more of the features described above, or as an alternative, in further embodiments at least one of coarsely machining and precision machining the work piece includes rotating the work piece and rotating an attachment arranged in meshing engagement with the work piece, the work piece being charged as an anode and the attachment being charged as a cathode such that the attachment is configured to remove material from the work piece via electrochemical machining.

In addition to one or more of the features described above, or as an alternative, in further embodiments a single attachment is operable to coarsely machine the work piece and precision machine the work piece.

In addition to one or more of the features described above, or as an alternative, in further embodiments each of the plurality of gear teeth are formed in the work piece sequentially.

BRIEF DESCRIPTION OF THE DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

The detailed description explains embodiments of the disclosure, together with advantages and features, by way of example with reference to the drawings.

DETAILED DESCRIPTION

Figure 1:
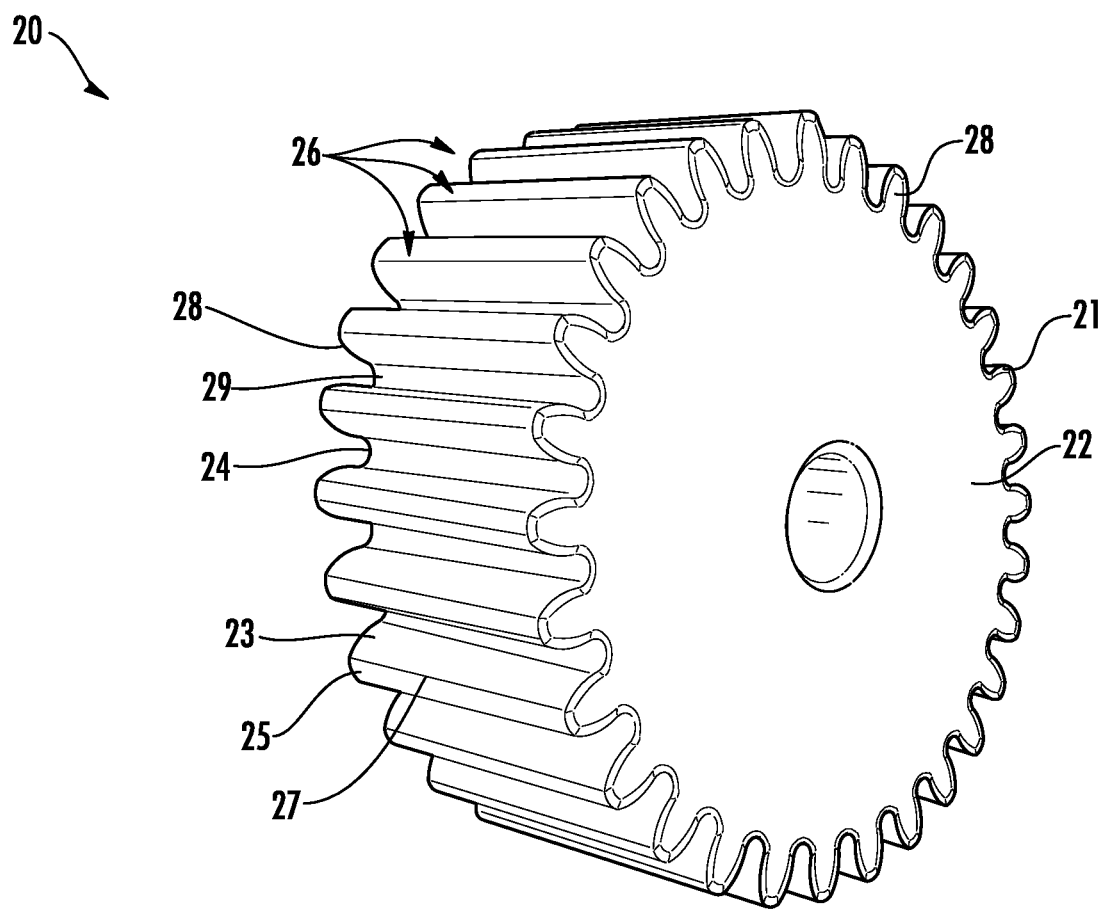
FIG. 1 is a perspective view of an example of a spur gear.

With reference to FIG. 1, an example of a gear used in transmission systems, such as a spur gear, is shown. The gear 20 includes a first side 22 and a second side 24 having a plurality of teeth 26 extending generally between the first and second sides 22, 24. Each tooth has two flanks 23 and a top land 25. A chamfer or radius may exist at edge 27 where flank 23 and top land 25 meet. A transition area exists between the two flanks 23 in the root radius 29 of the gear. This transition may be a full radius, or any other type of transition geometry (e.g. a trochoidal geometry). Each tooth of the plurality of teeth 26 has tooth faces 28 that are formed on the exterior facing portions adjacent the first and second sides 22, 24 of the gear. Faces 28 have edge breaks 21 around the perimeter. These edge breaks 21 may be a radius or a chamfer of any size. The gear 20 of FIG. 1 is provided merely as an example and those of skill in the art will appreciate that other types of gears are also considered within the scope of the present disclosure. Examples of other gears may include, but are not limited to, helical, double-helical, herringbone, spur, or any other type of gear.

Figure 2:
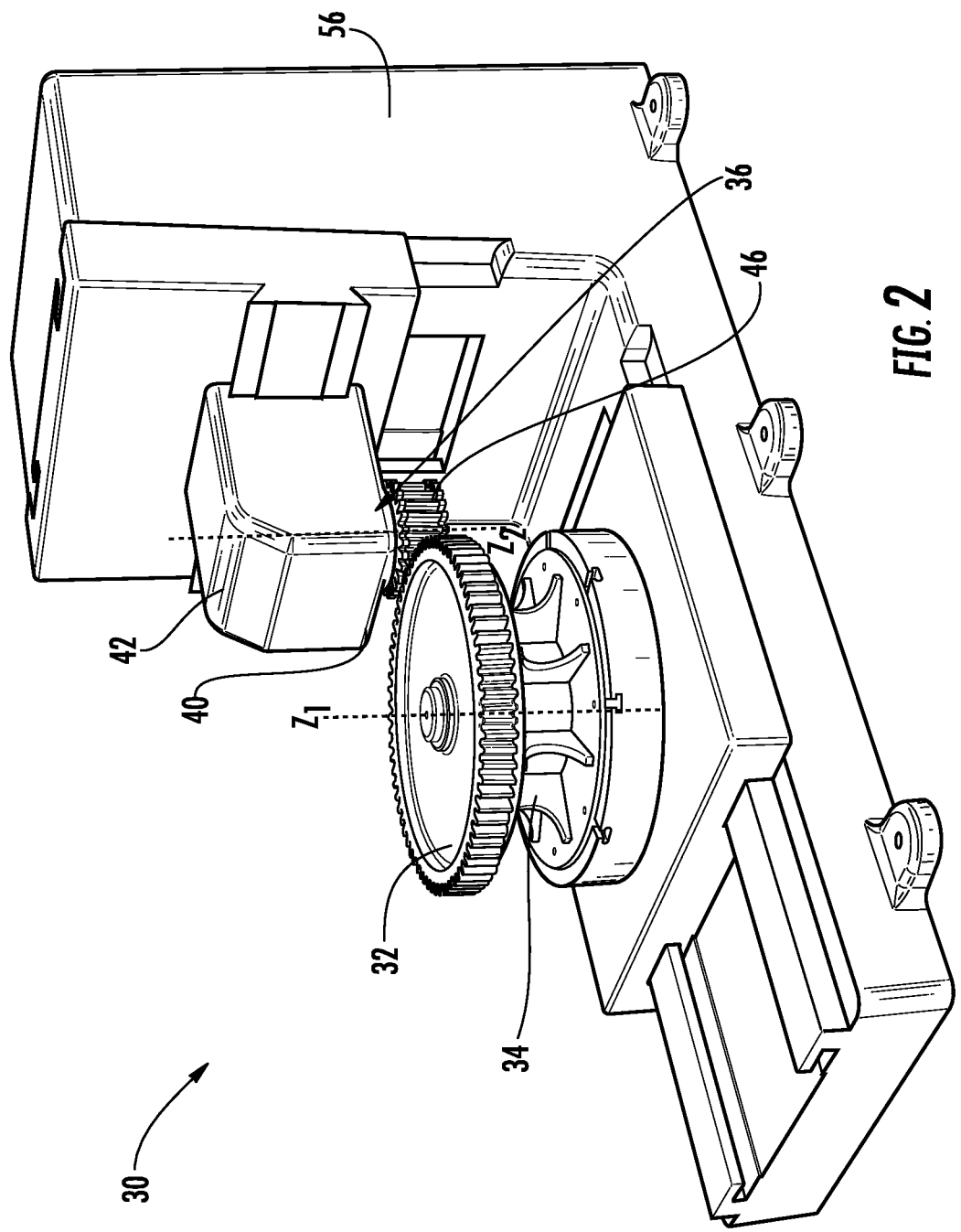
FIG. 2 is a perspective view of a machine for precision electrochemical forming one or more gear teeth according to an embodiment.

With reference to FIG. 2, a machine 30, such as a precision electrochemical machine for example, is provided for machining a work piece 32 into a finished gear having a desired shape and tooth profile. Any suitable type of gear may be formed, including but not limited to gears having gear teeth that are linearly shaped, helically shaped, and double-helical or herringbone shaped for example.

The work piece 32 may have a substantially cylindrical initial shape with a first central longitudinal axis $Z_1$. The machine 30 includes a chuck or fixture 34 on which the work piece 32 may be disposed, and a rotary spindle 36. The rotary spindle 36 is configured to electrochemically remove material from the work piece 32. The rotary spindle 36 defines an elongate shape with a second central longitudinal axis $Z_2$. The rotary spindle 36 may be disposed relative to the chuck 34 and the work piece 32 such that the first longitudinal axis $Z_2$ and second central longitudinal axis $Z_1$ are generally parallel to one another. However, embodiments where the longitudinal axes $Z_1$, $Z_2$ of the rotary spindle 36 and the workpiece 32, respectively, are arranged at an angle to one another are also contemplated herein.

Figure 3:
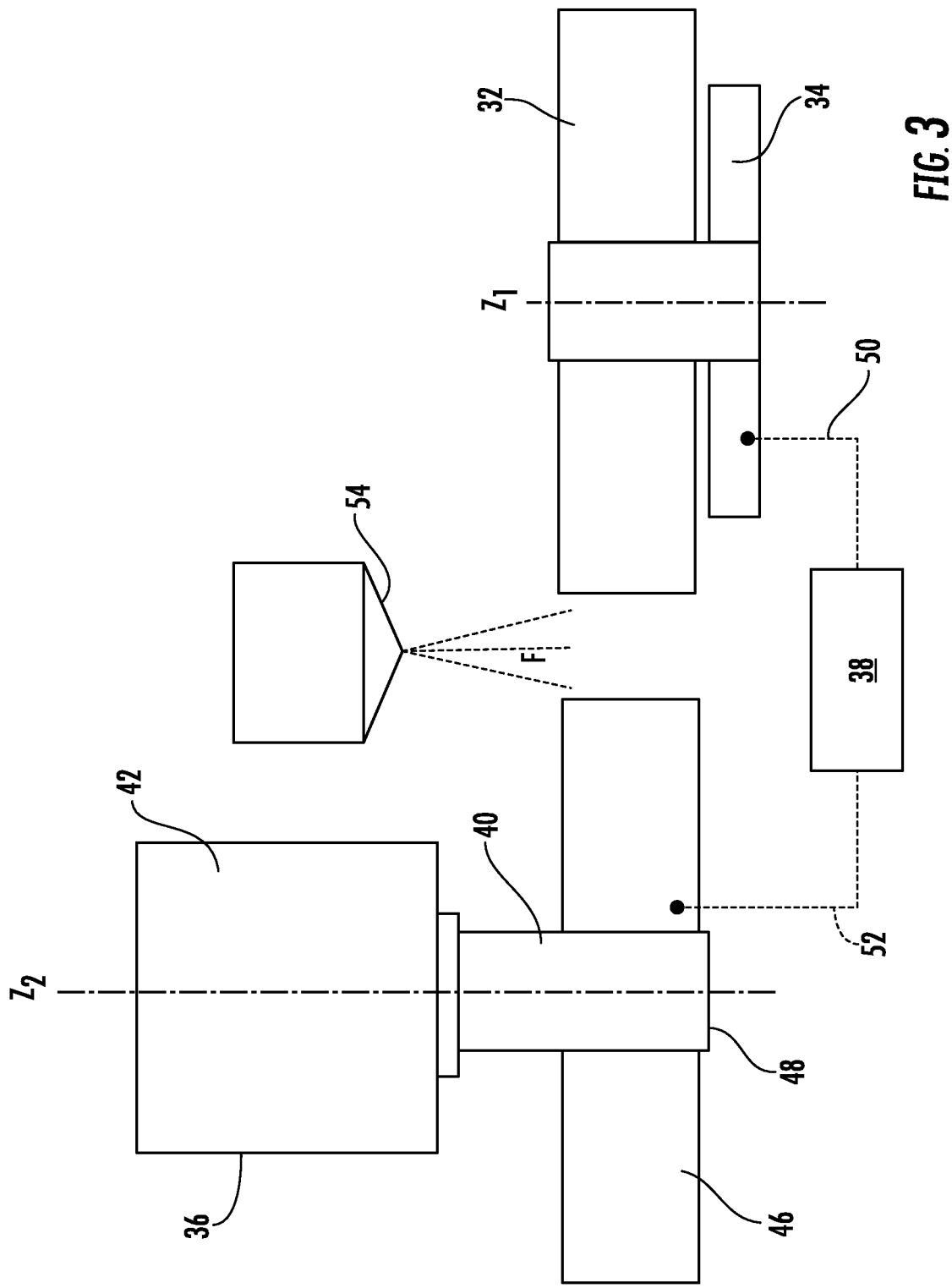
FIG. 3 is a cross-sectional diagram of the precision electrochemical machine according to an embodiment.

As best shown in FIG. 3, the rotary spindle 36 includes a shaft 40 and a spindle body 42. A first end of the shaft 40 is operably coupled to the spindle body 42 and is configured to rotate about the second central longitudinal axis $Z_2$. The spindle 36 is selectively operable to drive rotation of the shaft 40 about the second central longitudinal axis $Z_2$. The machine is arranged such that spindle 36 and workpiece 32 are electrically insulated from each other. As shown in FIGS. 2 and 3, an electrochemical machining (ECM) attachment 46 is removably mounted to the distal end 48 of the shaft 40. The ECM attachment 46 is configured to execute ECM processing on the work piece 32.

An ECM element 38 includes a first electrical lead 50, a second electrical lead 52, and a dispenser 54. The first electrical lead 50 is configured to positively charge the work piece (anode) 32, the second electrical lead 52 is configured to negatively charge the attachment (cathode) 46. The dispenser 54 is configured to dispense electrolytic fluid F toward the work piece 32. The opposite electrical charging of the work piece 32 and the attachment 46 in combination with the dispensation or application of the electrolytic fluid F toward the work piece 32 causes material of the work piece 32 to dissolve. Material from the workpiece (anode) 32 is electrolytically dissolved and carried away by the electrolyte F.

Figure 4:
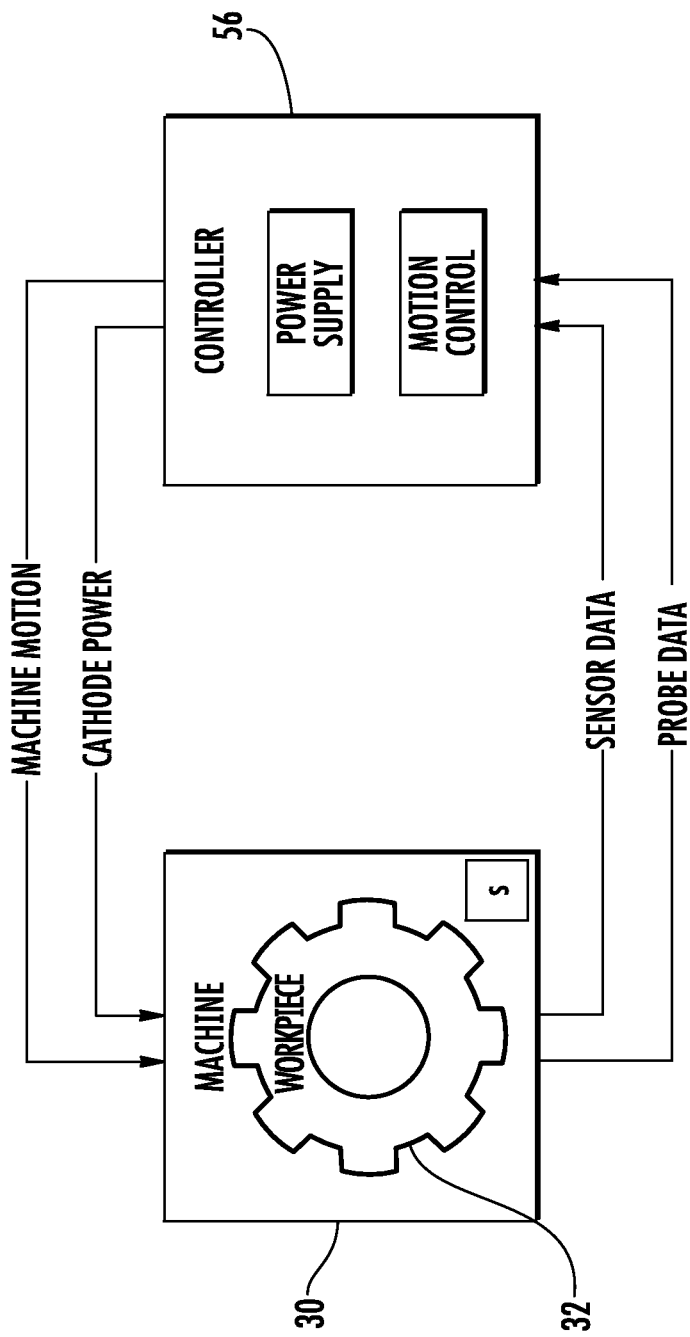
FIG. 4 is a schematic diagram of a portion of the precision electrochemical machine according to an embodiment.

As best shown in the schematic diagram of FIG. 4, a controller 56 is configured to control operation of the machine 30. In an embodiment, the controller 56 not only provides power to energize the ECM element 38, but also generates commands to position the various elements with respect to one another for machining the work piece 32 into a gear. Further, in an embodiment, the machine 30 includes at least one sensor S configured to communicate data collected by the sensor S to the controller 56. The sensor S may be configured to measure or monitor the forming, i.e. removal of material from the work piece 32 in real time. The controller 56 may compare the sensed dimensions with the desired dimensions in response to receiving the information from the sensor S and adjust one or more parameters of operation of the machine 30 if the difference is outside of an allowable threshold.

Figure 5:
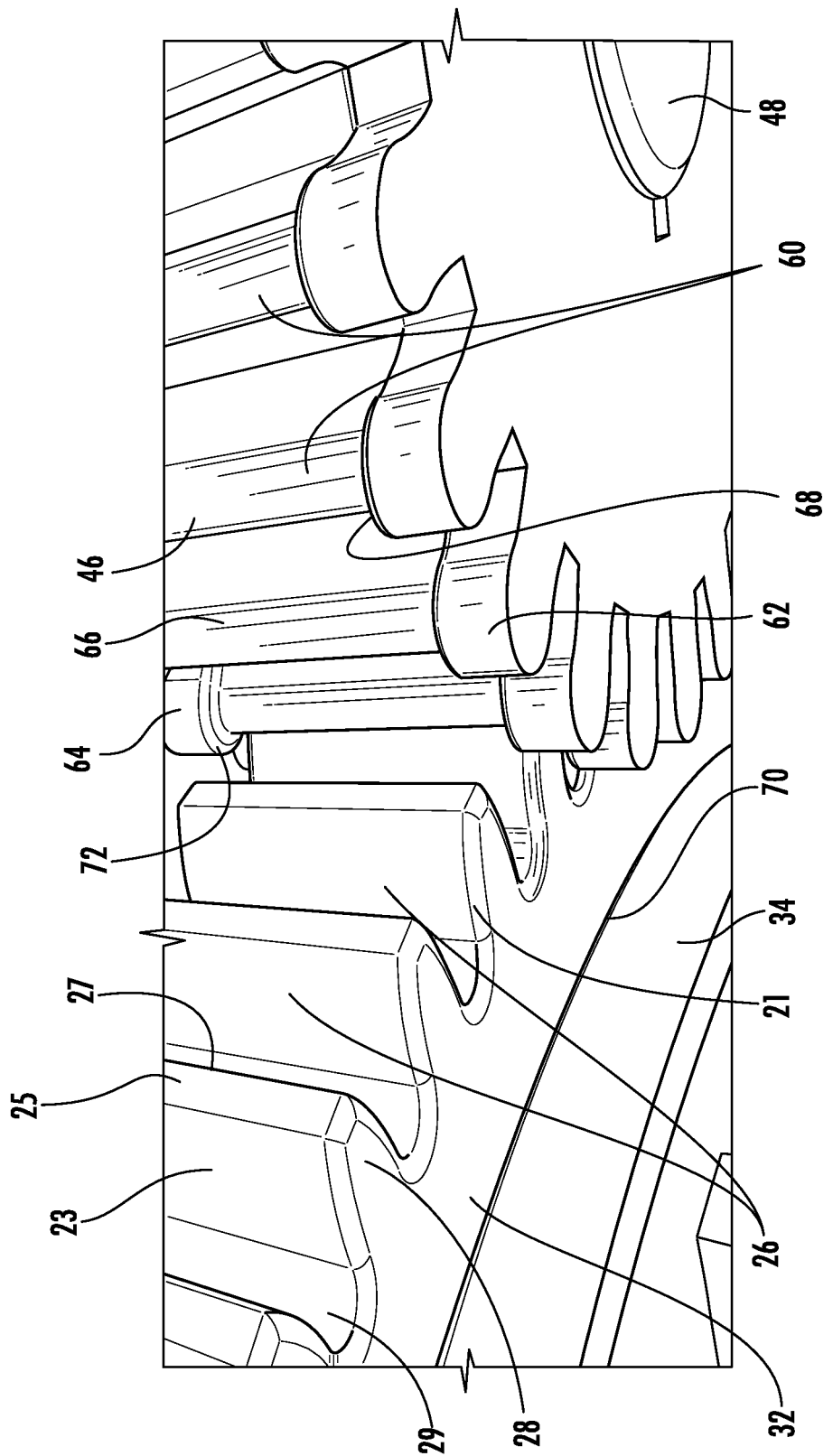
FIG. 5 is a perspective view of an interface between a cathode attachment and a workpiece during operation of the precision electrochemical machine according to an embodiment.

Turning now to FIG. 5, an example of the ECM attachment (cathode) 46 configured for use with the machine 30 to form a gear having a desired geometry is shown. In the illustrated, non-limiting embodiment, the ECM attachment 46 is generally cylindrical in shape and has a plurality of features 60 formed about the periphery of the attachment 46. However, embodiments where the ECM attachment 46 has another shape are also contemplated herein. The plurality of features 60 may be the same, or alternatively, may vary about the circumference of the attachment 46.

In an embodiment, the ECM attachment 46 may have a diameter smaller than the diameter of the work piece 32, as shown in FIG. 2. In alternative embodiments, the diameter of the ECM attachment 46 may be substantially equal to or larger than the diameter of the work piece 32. In embodiments where the diameter of the ECM attachment 46 is smaller than the diameter of the work piece 32, several rotations of the ECM attachment 46 occur during a single rotation of the work piece 32. Similarly, in embodiments where the diameter of the ECM attachment 46 is larger than the diameter of the work piece 32, more than one rotation of the work piece 32 occurs during a single rotation of the ECM attachment 46. Accordingly, in embodiments where the rotation between the work piece 32 and ECM attachment 46 is not equal, each of the plurality of features 60 formed about the periphery of the ECM attachment 46 is substantially identical. However, in embodiments where the diameter of the work piece 32 is generally equal to the diameter of the ECM attachment 46, the plurality of features 60 may be substantially identical, or alternatively, may vary.

The ECM attachment (cathode) 46 may form multiple surfaces of a gear tooth simultaneously. In an embodiment, the ECM attachment 46 is contoured to form not only a flank 23, and root 29 of the plurality of teeth of a gear, but also to form the top land 25. The ECM attachment 46 charged as a cathode also forms edge breaks at edges 21 & 27. These edge breaks at 21 & 27 may be chamfers, radii, or any desirable form.

In an embodiment, the ECM attachment 46 charged as a cathode is a negative form of the gear being formed from the workpiece 32. With reference now to non-limiting embodiment of FIG. 5, each of the plurality of features 60 of the ECM attachment 46 includes a first end 62, a second, opposite end 64, and a contoured member 66 extending between and coupling the first and second ends 62, 64. In the illustrated, non-limiting embodiment, the ends 62, 64 of each feature 60 are radially oversized relative to the contoured member 66. The width of the contoured member 66 is generally equal to the face width of a corresponding gear tooth being formed in the work piece 32 such that in operation, an inwardly facing surface 68 of the first end 62 is arranged adjacent a first end 70 of the work piece 32 and an inwardly facing surface 72 of the second end 64 is arranged adjacent a second end (not shown) of the work piece 32. However, embodiments where the first end 62, second end 64, and contoured member 66 have another configuration are also contemplated herein. Further, it should be understood that an attachment 46 having any suitable configuration is within the scope of the disclosure.

During operation of the machine 30, the ECM attachment 46 charged as a cathode and the work piece 32 charged as an anode are rotated about their longitudinal axes, $Z_2$, $Z_1$, respectively, to sequentially form a plurality of teeth in the work piece 32. As each feature 62 of the ECM attachment 46 approaches the work piece 32, an electrical current is applied to the attachment 46 and the work piece 32 via the ECM element 38 and controller 56. This electrical current causes a portion of the material of the work piece 32 adjacent the feature 62 of the ECM attachment 46 to be removed without the ECM attachment 46 directly contacting the work piece 32 during a machining operation. Accordingly, the shape and amount of material removed from the work piece 32 is controlled not only by the geometry of the feature 62 configured to mesh with the work piece 32, but also by the electrical characteristics of the current supplied to the work piece 32 and/or to the attachment 46.

During all machining operations, electrolytic fluid F is expelled from the dispenser 54 as material is removed from the work piece 32. The fluid F is provided to the clearance or gap formed between the work piece 32 and an adjacent feature 62 of the ECM attachment 46 to remove the swarf or debris accumulated therein as a result of the electrical current.

Figure 6:
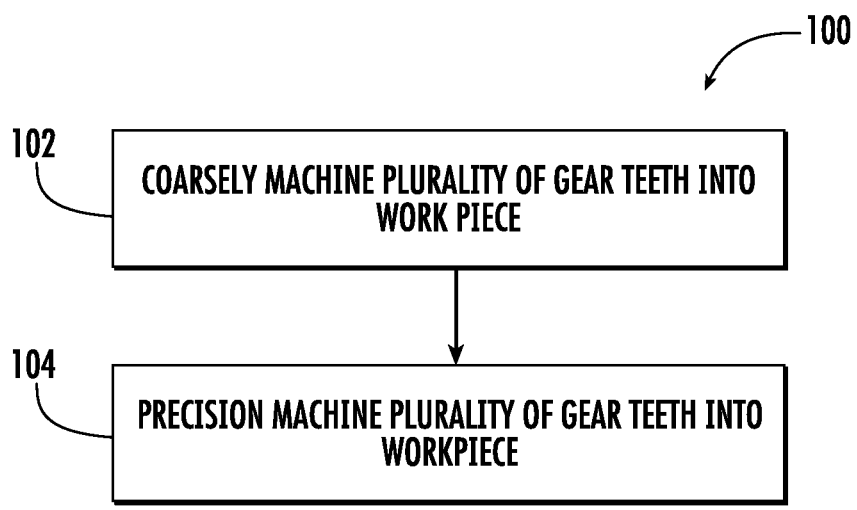
FIG. 6 is a block diagram of a method of manufacturing a gear according to an embodiment.

Turning now to FIG. 6, a method 100 of manufacturing a gear, such as gear 20 for example, is illustrated. The method 100 first includes coarse machining of the work piece 32 to roughly form a plurality of gear teeth into a solid work piece 32 using an ECM machine (block 102), such as the ECM machine 30 described above. As used herein the term rough or coarse machining identifies a process in which the dimensions formed are not the final dimensions of the work piece 32. In an embodiment, coarsely forming the plurality of gear teeth may occur within a single pass, via a three hundred and sixty degree rotation of the work piece 32 relative to the ECM attachment 46. However, embodiments, where multiple rotations of the work piece 32 about its axis $Z_1$ are required to roughly form the plurality of teeth 26 of the gear are also contemplated herein.

After the plurality of gear teeth are coarsely formed, the same ECM attachment 46 is similarly used to refine the gear tooth geometry (block 104). This refinement of the gear teeth occurs via a precision machining operation configured to form the work piece 32 into a final configuration. Further, this precision forming of the teeth may occur via a single pass or rotation of the work piece 32 about its axis, or alternatively, via multiple rotations about its axis.

In an embodiment, the machine 30 is configured to automatically transition from coarse forming of the plurality of gear teeth 26 to precision forming of the plurality of gear teeth 26 such that formation of a finalized gear 32 from a solid, unformed work piece 32 occurs continuously. Accordingly, no pause occurs as the controller 56 varies the parameters of operation as each consecutive feature 62 of the tool 46 approaches the work piece 32 or as the machine 30 transitions between coarse forming and precision forming of the work piece 32. Of course, it will be understood that the machining method 100 need not be limited to the ECM methods and machines described above and can be replaced by any suitable machining method, process, and/or machine designed to form any tooth shape, geometry, and/or configuration (e.g., a tooth shape that is reflective of the ECM attachment 46 charged as a cathode having an involute profile, straight tooth profile, buttress tooth profile, etc., e.g., splines).

Because the ECM attachment 46 charged as a cathode does not directly contact the work piece 32 as with a grinding operation, no heat is generated and no physical deflection of the attachment 46 occurs. Therefore, the attachment 46 does not wear out with use resulting in an increased repeatability compared to conventional grinding tools. Further, use of the machine 30 and attachment 46 may reduce the overall time for forming a precision gear and may allow for lighter weight and unconventional gear geometries. Additionally, the attachment 46 can be replaced such that different gear shapes can be formed for different work pieces 32.

While the disclosure has been described in detail in connection with only a limited number of embodiments, it should be readily understood that the invention is not limited to such disclosed embodiments. Rather, the disclosure can be modified to incorporate any number of variations, alterations, substitutions or equivalent arrangements not heretofore described, but which are commensurate with the spirit and scope of the disclosure. By way of example, aspects of the disclosure can be used in non-aerospace gear applications, such as for any gears used in automotive, maritime, industrial, elevator and locomotive applications. Additionally, while various embodiments of the disclosure have been described, it is to be understood that aspects of the disclosure may include only some of the described embodiments. Accordingly, the disclosure is not to be seen as limited by the foregoing description, but is only limited by the scope of the appended claims.

What is claimed is:

1. A method of manufacturing a gear, the method comprising:
    coarsely machining a solid workpiece to roughly form a gear configuration in the workpiece;
    precision machining the workpiece to refine the gear configuration to a final dimension, wherein the coarsely machining and the precision machining processes comprise:
    applying a first charge to the workpiece and applying a second, opposite charge to an electrochemical machining (ECM) attachment, the ECM attachment having a pattern; and
    simultaneously forming a plurality of surfaces of a plurality of gear teeth in the workpiece using the pattern of the ECM attachment while applying the first charge to the workpiece and applying the second charge to the ECM attachment and turning the workpiece and the ECM attachment in opposite rotational directions such that the gear configuration comprising the plurality of gear teeth is formed in the workpiece, the plurality of surfaces of the plurality of gear teeth including at least one end face and a top land, wherein during the coarsely machining and the precision machining processes, the ECM attachment does not directly contact the workpiece.

2. The method of claim 1, wherein applying the first charge to the workpiece and applying the second charge to the ECM attachment results in removal of material from the workpiece.

3. The method of claim 2, wherein applying the second charge to the ECM attachment charges the ECM attachment as a cathode.

4. The method of claim 3, wherein turning the workpiece and the ECM attachment in opposite rotational directions further comprises turning the workpiece about a first axis and turning the ECM attachment about a second axis, the ECM attachment and the workpiece being oriented in an intermeshing arrangement.

5. The method of claim 4, wherein the first axis and the second axis are parallel.

6. The method of claim 1, wherein a single cathode is used for coarsely machining the work piece and for precision machining the work piece.

* * * * *